July 20, 1943.  P. F. ROEDER  2,324,648
CREAM WHIPPING APPARATUS
Filed June 4, 1940   2 Sheets-Sheet 1
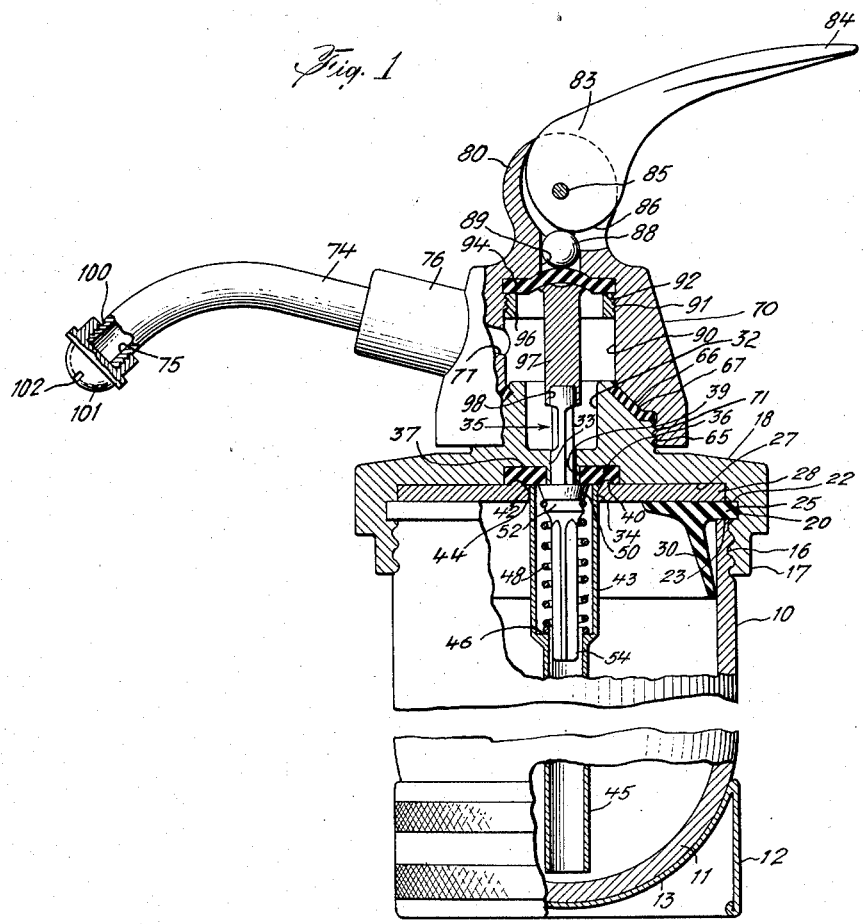
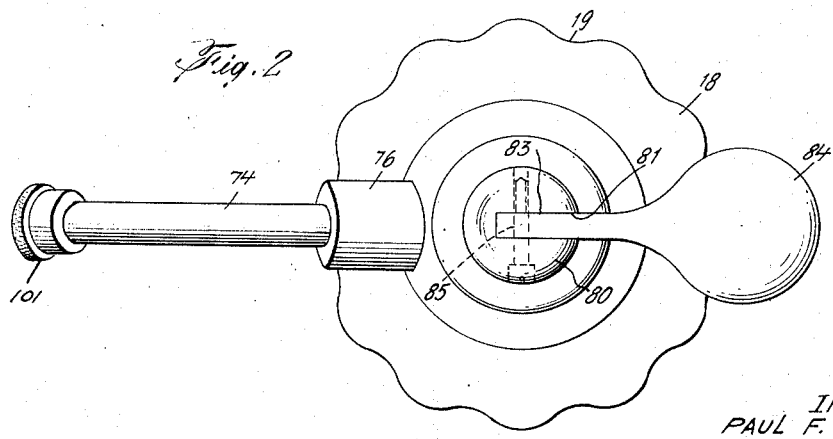
INVENTOR
PAUL F. ROEDER
BY John P. Chandler
his ATTORNEY

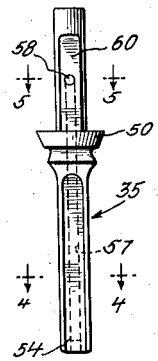
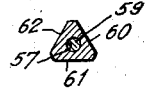
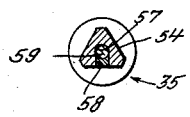
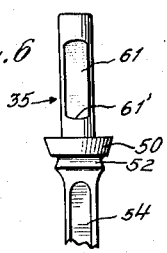
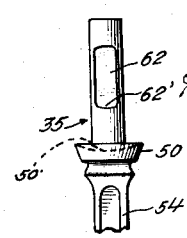
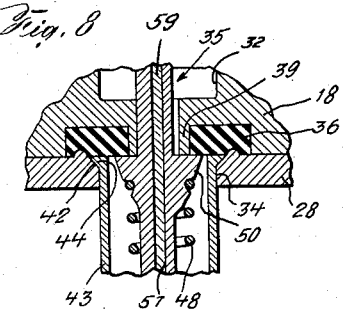
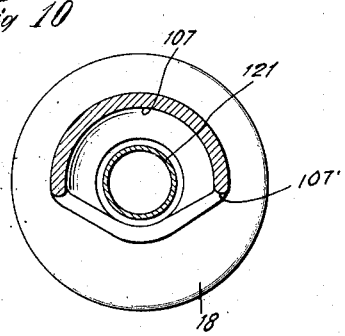
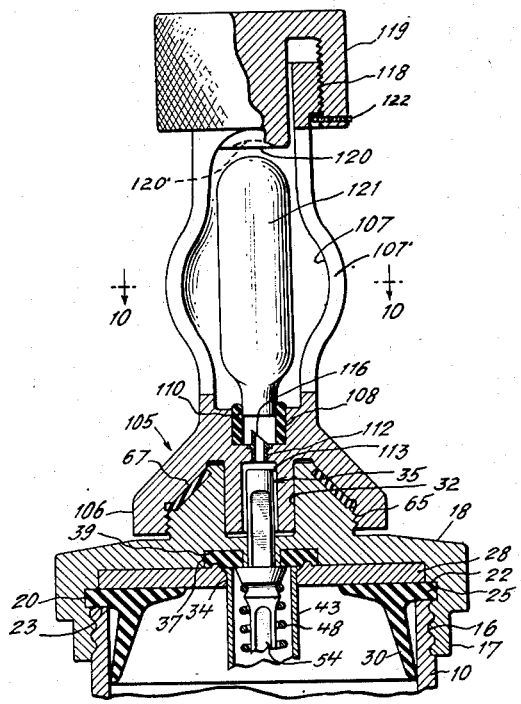

Patented July 20, 1943

2,324,648

UNITED STATES PATENT OFFICE 2,324,648

CREAM WHIPPING APPARATUS

Paul F. Roeder, Brooklyn, N. Y.

Application June 4, 1940, Serial No. 338,779

4 Claims. (Cl. 221—74)

This invention relates to new and useful improvements in pressure vessels, and relates more particularly to a novel apparatus for mixing liquids and gases, the liquid in the ordinary use of the device being cream which is mixed with a gas such as nitrous oxide under considerable pressure, and when a valve of improved construction is opened the cream, now intimately intermixed with the gas, is discharged through a constricted orifice, such cream having the texture and consistency of "whipped" cream.

Devices of this general character have been used, but they have been unsatisfactory for the reason that the arrangement of parts has been such as to render thorough cleaning of the surfaces relatively impossible. Thus, one of the principal objects of the present invention is the provision of a device of this general character wherein the surfaces in which the cream contacts after leaving the pressure vessel are open and readily accessible, and a daily cleaning of such parts is a simple and quick operation.

Another object of the invention is to provide a device of this character having a head portion which can be readily removed and cleaned without removing the closure cap for the vessel. Thus, the cream and the gas under pressure can remain undisturbed in the vessel until the cream is exhausted, novel means being provided for charging the vessel with additional gas as the pressure becomes too low for effective operation.

A further object of the invention is the provision of a pressure vessel having a discharge opening and provided with a distinctly novel sealing gasket which effectively seals the gases within the vessel.

Still another object of the invention is the provision of an improved valve structure which is simple in construction and positive in operation, and effectively prevents any escape or loss of the contents of the vessel.

The invention has for a further object the provision of a novel head which is readily removable from the closed vessel, the head having associated therewith manually operated, valve actuating means mounted at the upper end thereof, such means being effectively sealed from the valve member and associated portions on the upper surface of the closure cap. In other words, the cream, as it leaves the valve opening in the closure cap, is prevented from having any contact with the external valve actuating means, thus preventing a loss of the cream. The manually actuated means in this instance comprises a lever having a cam portion which engages a spherical member positioned above, but in contact with, the sealing means comprising a resilient disc.

A still further object of the invention includes the provision of novel means for releasing the gases in the pressure vessel in the event of fire, thus preventing an explosion of the vessel in case the temperature of the vessel, resulting from such fire, is so great as to increase the pressure to a dangerous point.

Another object of the invention is the provision of improved means for charging the vessel with gas, including means for employing a cartridge of well-known type containing the gas.

In the drawings:

Fig. 1 is a broken side elevation of the preferred embodiment of the present invention, a portion thereof being shown in central vertical section.

Fig. 2 is a top plan view thereof.

Fig. 3 is an enlarged detail view of the valve member.

Fig. 4 is a transverse section taken on line 4—4 of Fig. 3.

Fig. 5 is a transverse section taken on line 5—5 of Fig. 3.

Fig. 6 is a broken elevation of the upper end of such valve member showing a second side thereof.

Fig. 7 is similar to Fig. 6 but shows a third side thereof.

Fig. 8 is an enlarged broken detail section of the valve portion of the device.

Fig. 9 is a central vertical section through a portion of the device and through the charging means employing a cartridge of the gas under pressure; and Fig. 10 is a horizontal section taken on line 10—10 of Fig. 9.

The preferred embodiment of the present invention includes an elongated, substantially cylindrical pressure vessel 10 which may be made from metal, glass, transparent plastic material, or any other suitable material. The lower end of the vessel is rounded, as shown at 11, and a base member 12 having a concave central section 13 receives this lower end 11 of the vessel and is secured thereto by any suitable means.

The vessel is open at its upper end and is provided with an externally threaded portion 16 which receives an internally threaded flange portion 17 of a closure cap 18. The outer periphery of the closure cap is formed with a plurality of concavely curved recesses 19 to aid in manually screwing the closure cap upon the vessel. The flange portion 17 is further formed with an inner annular recess 20 just above the threaded portion, the diameter of which is slightly greater than the external diameter of the vessel 10. Between the upper edge 22 of this annular recess and the upper edge 23 of the vessel a sealing gasket 25 is positioned.

The lower surface of cap 18 is further formed with a circular recessed portion 27 which receives a circular plate 28, the lower surface of which plate engages the upper surface of the gasket 25 which extends inwardly a considerable distance toward the center of the plate 28. The gasket is further formed with a downwardly depending annular flange portion 30.

When the cap 18 is initially screwed onto the open end of the pressure vessel, the exterior surface of this flange portion 30 may be spaced a slight distance from the inner wall of the vessel 10, except at the lower edge of such flange portion 30 which is in engagement with the inner wall of such pressure vessel, as shown in Fig. 1. As pressure is developed in the vessel, however, this flange portion 30 moves outwardly and forms a relatively tight seal.

The upper surface of closure cap 18 is formed with a central, downwardly extending recessed portion 32 and a central aperture 33 which receives a valve member 35, which is illustrated in detail in Figs. 3-8, inclusive. The annular gasket 25 effectually prevents any of the gas contained within the vessel from escaping between the flange portion 30 and the inner surface of the vessel, and between the upper surface of such gasket and circular plate 28.

The plate 28 is formed with a central aperture 34, and the gas contained within the vessel is further prevented from passing outwardly through this aperture and through the area between plate 28 and the lower surface of the closure cap by means of a second annular gasket 36 positioned within an annular recess 37 in the lower surface of the closure cap. It will be noted that this recess does not extend inwardly as far as the aperture 33 in the closure cap, and thus a thin annular wall 39 is formed between recess 37 and aperture 33, the lower edge of such annular portion 39 serving as a seat for the valve 35.

In order to make this seal relatively more perfect, the upper edge of the plate 28 is formed with an annular rib or projection 40, and when the closure cap and gasket 35 are secured in place in the manner shown in Fig. 1, the annular ribbed portion 40 extends into the gasket 35.

The upper edge of aperture 34 in plate 28 is slightly enlarged, as shown at 42, and a tube 43 having an annular flange 44 is positioned within aperture 34, the flanged portion 44 being seated in the enlarged portion 42. The tube 43 is provided with a reduced portion 45 which extends downwardly in the vessel to a point adjacent to the lower wall thereof, the upper edge of this reduced portion forming an annular seat 46 which supports the lower end of a coil compression spring 48.

Substantially intermediate between the upper and lower terminals of valve member 35 an enlarged valve portion 50 is formed which, when the valve is closed, engages the valve seat 39 aforesaid. Just below such valve portion an annular recess 52 is formed and the upper end of spring 48 is positioned within such recess, the spring 48 being of such length as to normally urge valve portion 42 in engagement with seat 39.

The portion 54 of valve 35 below recess 52 is substantially triangular in transverse section, as shown in Fig. 5, and such portion is formed with a longitudinal aperture 57 which terminates in a horizontal portion 58 above valve portion 50. Aperture 57 is filled with suitable metal 59 having a relatively low melting point. In the event that a fire should occur and the temperature of the gases within the pressure vessel should increase to a point wherein the safety of the vessel is endangered, such temperature resulting from the fire or otherwise will cause this metal 59 to melt, thus permitting the gases to escape from the pressure vessel without destroying the latter.

Further details of valve 35 are illustrated in Figs. 3-7, inclusive, and it will be noted that the portion of this valve member above valve portion 50 is substantially circular in transverse section, except that three substantially equally-spaced flat portions 60, 61 and 62 are formed. Each of these three portions extends upwardly to within a short distance of the top of the valve member, and portion 60 illustrated in Fig. 3 extends downwardly to valve portion 50. Flat surface 61 extends downwardly to a point 61' which is within a short distance of valve portion 50, and portion 62 extends downwardly to a point 62' which is substantially twice the distance above valve portion 50 that point 61' lies above valve portion 50.

It will thus be apparent that as valve member 35 is depressed, valve portion 50 becomes unseated and provides a small opening equal to the cross-sectional area between flat portion 60 and aperture 33, thus permitting a pre-determined quantity of the mixture contained within the vessel to escape. As the valve member is further depressed and the lower terminal 61' of flat portion 61 travels below the lower end of aperture 33, the area of escape becomes substantially doubled, and further depression of the valve member increases this area again when the lower terminal 62' of flat portion 62 forms an opening.

The closure cap 18 is further formed with a threaded portion 65 and a recessed portion 66 which forms a seat for a gasket 67. A removable head 70 is formed with an internal threaded portion 71 which is received upon threaded portion 65, and when such head 70 is screwed into place a firm seal is effected between such head 70 and cap 18. A spout 74 having a bore 75 is rigidly mounted on head 70 at 76, such spout being in alignment with an aperture 77 in such head.

The following means are provided in head 70 for depressing valve member 35. The upper terminal 80 of the head is formed with a vertical recess 81 which receives a manually depressible lever 83 having a handle portion 84 and being pivotally mounted at 85. This lever is formed with a cam surface 86, the cam surface engaging a ball member 88 positioned within a vertical aperture 89. The bore 90 of head 70 is formed with an upper threaded portion 91 and an enlarged annular recessed portion 92 which receives a circular rubber gasket 94. The gasket is sealed around its edges within the upper end of the bore or recess 92 by means of an externally threaded collar 96. The gasket is preferably moulded in the form shown wherein there is provided a central raised portion which can be manually depressed, thus depressing the valve, as hereinafter described, and after the upper pressure is released the disc returns to the position shown in Fig. 1.

A plunger 97 having a longitudinal opening 98 at its lower end is mounted on the upper terminal of valve member 35, and when the valve member is seated the upper terminal of plunger 97 is in engagement with gasket 94. As the plunger is depressed the ball 88 forces the central portion of gasket 94 downwardly, thus also depressing the plunger 97 and the valve member.

At its outer end spout 74 is threaded, as shown at 100, and a removable nozzle portion 101 having openings 102 is removably positioned thereon. In use, head 70 and closure cap 18 are first removed together with the internal parts, and a quantity of cream to be whipped is poured into the vessel. Cap 18 and head 70 are now replaced, as shown in Fig. 1, and if the gas is to be introduced from a cylinder of such gas or other source of supply the nozzle portion 101 is removed and an appropriate fitting screwed onto the threaded portion 100 of spout 74. The valve is then depressed and the gas permitted to enter the vessel. The device is now ready for use, and when the whipped cream is to be extruded the lever 83 is depressed, all as is well known in the art.

When the device is used in the home the tank or other source of supply of gas is not normally available, and in this instance a special charging head 105 is employed. Head 70 is first removed and charging head 105 is screwed in place, as shown in Fig. 9. Head 105 is formed with a lower internally threaded portion 106, which is screwed onto threaded portion 65 of closure cap 18. Head 105 is further formed with a longitudinal recess 107 having a reduced portion 108 at its lower end, such portion receiving a collar 110 of resilient material.

Below enlarged portion 108 a smaller aperture 112 is formed which communicates with an enlarged portion 113, which receives the upper end of the valve member 35. Within aperture 112 a knife member 116 is also positioned. At its upper end, charging head 105 is formed with an externally threaded portion 118 which receives a screw cap 119 having a downwardly extending central portion 120.

An opening 107' in the side wall of the charging head 105 permits a conventional cartridge 121 to be placed within aperture 107, the lower end of the cartridge being positioned within the collar 110 in lower aperture 108. It will thus be seen that as screw cap 119 is rotated, central portion 120 moves downwardly, thereby forcing the cartridge downwardly to a point wherein the knife member 116 punctures the seal at the lower end of the cartridge, thus permitting the gas to escape and forcing valve member 35 downwardly and permitting the gas within the cartridge to enter the pressure vessel.

In order to prevent sidewise movement of the cartridge 121, the lower surface of central portion 120 is provided with a curved recessed portion 120' which receives the upper end of cartridge 121. The screw cap 119 is prevented from being removed from the upper end of the charging head 105 by means of a set screw 122 positioned adjacent to the lower edge of such screw cap, the external surface of which is knurled or otherwise rendered non-smooth, as indicated at 123.

If desired, valve portion 50 may be modified by providing a concave recess 50' in the upper surface thereof, as shown in broken lines in Fig. 7. Thus, when the valve is in closed position the annular edge formed by such recess is in firm engagement with resilient gasket 36, thus effectively sealing the valve opening. It will be apparent that many other changes and modifications may be made in the foregoing described device without departing from the spirit of the invention as defined by the appended claims.

What I claim is:

1. In a pressure vessel comprising a container, an apertured closure cap therefor, a head removably carried by the closure cap, a tube leading from the closure cap into the container, and a dispensing spout leading from the head, the combination of a valve structure comprising a shank positioned within the aperture in the closure cap and having a cross-sectional area shaped to fit the aperture, the shank having a plurality of recesses of varying lengths above the closure cap, and a valve member lying below such closure cap, whereby progressive downward movement of the shank provides a progressively increased valve opening, means for urging the valve member upwardly into closed position, manual means for depressing the valve member comprising a lever provided with a cam surface at the upper end of the head, such cam surface lying adjacent to the upper terminal of the shank, and a resilient disc positioned between such upper terminal and the cam surface.

2. In a pressure vessel comprising a container, an apertured closure cap therefor, a head removably carried by the closure cap, a tube leading from the closure cap into the container, and a dispensing spout leading from the head, the combination of a valve structure comprising a shank positioned within the aperture in the closure cap, and a valve member lying below such closure cap, means for urging the valve member upwardly into closed position, manual means for depressing the valve member comprising a lever provided with a cam surface at the upper end of the head, such cam surface lying adjacent to the upper terminal of the shank, and a resilient disc positioned between such upper terminal and the cam surface.

3. In a pressure vessel comprising a container, an apertured closure cap therefor, a head carried by the closure cap, a tube leading from the closure cap into the container, and a dispensing spout leading from the head, the combination of a valve structure comprising an elongated valve member positioned within the aperture in the closure cap and having a cross-sectional area shaped to fit the aperture, a valve seat formed on the lower surface of the closure cap, such valve seat having an annular recess therein, and a resilient member positioned within such recess, the valve member having a plurality of longitudinal recesses of varying lengths lying above the closure cap when the valve member is closed, and a valve element carried at the lower end of the valve member, whereby progressive downward movement of the shank provides a progressively increased valve opening, means for urging the valve member upwardly into closed position, and manual means for depressing the valve member comprising a lever provided with a cam surface at the upper end of the head, such cam surface lying adjacent to the upper terminal of the member.

4. In a pressure vessel comprising a container, an apertured closure cap therefore, a head removably carried by the closure cap, a tube leading from the closure cap into the container, and a dispensing spout leading from the head, the combination of a valve structure comprising a shank positioned within the aperture in the closure cap, and a valve member carried at the lower end of the shank, the lower surface of the closure cap adjacent the aperture forming a valve seat, spring means for urging the valve member upwardly into closed position, manual means for depressing the valve member comprising a depressible member positioned adjacent to the upper end of the head and engaging the upper terminal of the shank, and a resilient disc positioned between such upper terminal and the depressible member.

PAUL F. ROEDER.